United States Patent
Watanabe et al.

(10) Patent No.: US 11,656,151 B2
(45) Date of Patent: May 23, 2023

(54) SENSOR

(71) Applicant: NGK Insulators, Ltd., Nagoya (JP)

(72) Inventors: Yusuke Watanabe, Nagoya (JP); Shotaro Niizuma, Nagoya (JP); Hayami Aota, Nagoya (JP); Toshihiro Hirakawa, Nagoya (JP); Kirari Takahashi, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 17/699,836

(22) Filed: Mar. 21, 2022

(65) Prior Publication Data

US 2022/0316985 A1    Oct. 6, 2022

(30) Foreign Application Priority Data

Mar. 31, 2021  (JP) .............................. JP2021-058946
Feb. 8, 2022   (JP) .............................. JP2022-017927

(51) Int. Cl.
*G01M 15/10*   (2006.01)
*F01N 13/00*   (2010.01)

(52) U.S. Cl.
CPC ......... *G01M 15/102* (2013.01); *F01N 13/008* (2013.01); *F01N 2560/026* (2013.01); *F01N 2560/20* (2013.01)

(58) Field of Classification Search
CPC ................ G01M 15/102; F01N 13/008; F01N 2560/026; F01N 2560/20; F01N 2560/02; G01N 27/4077; G01N 27/4067
See application file for complete search history.

(56) References Cited

U.S. PATENT DOCUMENTS

| | | | |
|---|---|---|---|
| 7,722,750 B2* | 5/2010 | Toguchi ............. | G01N 27/4077 204/424 |
| 8,413,483 B2* | 4/2013 | Yamada ............. | G01N 27/4077 73/23.31 |
| 10,024,432 B2* | 7/2018 | Linck-Lescanne ... | F16L 41/008 |
| 10,775,357 B2* | 9/2020 | Adachi ............. | G01N 33/0009 |
| 2010/0263434 A1* | 10/2010 | Aoki ................. | G01N 27/4077 73/23.32 |

(Continued)

FOREIGN PATENT DOCUMENTS

| | | |
|---|---|---|
| JP | 2017-223619 A | 12/2017 |
| JP | 2018-536860 A | 12/2018 |
| JP | 2020-180985 A | 11/2020 |

*Primary Examiner* — Freddie Kirkland, III
(74) *Attorney, Agent, or Firm* — Mattingly & Malur, PC

(57) ABSTRACT

The probability of a heater portion of a sensor element being exposed to water is lowered. The sensor element includes a built-in heater that extends in a longitudinal direction and a surrounding housing extending in the longitudinal direction. The heater includes a heat generation portion and a lead portion. The heat generation portion has a front end and a rear end, and is positioned on the same side as a front end portion side of the sensor element. The housing includes an enlarged diameter portion having a diameter of an inner wall that increases in a direction toward the front end of the sensor. The enlarged diameter portion includes a front end portion and a rear end portion. The rear end of the heat generation portion is located closer to the front end of the sensor than the rear end portion of the enlarged diameter portion is.

9 Claims, 8 Drawing Sheets

(56) References Cited

U.S. PATENT DOCUMENTS

2017/0363599 A1 12/2017 Adachi et al.
2018/0321125 A1 11/2018 Holzknecht et al.
2021/0080424 A1* 3/2021 Niizuma ............ G01N 27/4073

* cited by examiner

SENSOR

CROSS-REFERENCE TO RELATED APPLICATION

The present application claims priority from Japanese applications JP2021-058946, filed on Mar. 31, 2021 and JP2022-01792, filed Feb. 8, 2022, the contents of which are hereby incorporated by reference into this application.

TECHNICAL FIELD

The present invention relates to a sensor.

BACKGROUND ART

There is a sensor (for example, the gas sensor disclosed in JP 2020-180985A) that includes a sensor element. To reduce the effect of temperature, the sensor element may have a built-in heater. For example, in the invention proposed in JP 2020-180985A, a heater is built into a sensor element in order to activate the solid electrolyte constituting the sensor element.

In addition, a sensor may be used in a place exposed to environmental influences such as weather. In one example, a gas sensor is placed in the exhaust pipe of a vehicle to monitor the exhaust gas of the vehicle. In such a case, if the sensor element (particularly, a portion in which the heater is present) is exposed to water (i.e., if the sensor element gets wet) due to, for example, humidity, dew condensation, rain, or the like, the efficiency of heating by the heater is lowered, which may result in adverse effects such as the possibility of cracks being caused in the sensor element.

In contrast, JP 2017-223619A and JP 2018-536860A, for example, propose to protect the sensor element with a cover member such as a protective cover, a housing, or the like. With the cover member proposed in JP 2017-223619A and JP 2018-536860A, it is possible to lower the probability that the sensor element (particularly, a portion in which the heater is present) is exposed to water, and reduce the possibility of the above-described adverse effects being caused.

JP 2020-180985A, JP 2017-223619A, and JP 2018-536860A are examples or related art.

SUMMARY OF THE INVENTION

The inventors of the present invention have found that the conventional cover member has the following problems. That is to say, in the housing proposed in JP 2018-536860A, the diameter of the inner wall increases toward the front end, and accordingly the distance between the sensor element and the inner wall of the housing increase toward the front end. As a result, it is possible to lower the probability of the sensor element being exposed to water, even when water is generated on the inner wall of the housing due to dew condensation or the like, for example. However, such a shape of the housing alone may be insufficient as a measure against water exposure. In one example, water generated due to dew condensation or the like may flow along the inner wall of the housing to the rear end of the portion where the diameter increases (the starting point where the diameter increases), and water may drip from this point toward the sensor element. Such dripping water may fall on the vicinity of the heating portion of the heater of the sensor element, which may cause the adverse effects described above.

One aspect of the present invention has been made considering such circumstances, and an object thereof is to provide a sensor in which the probability of a heater portion of a sensor element being exposed to water is lowered.

To solve the above-described problems, the present invention employs the following configurations.

A sensor according to one aspect of the present invention includes: a sensor element that includes a built-in heater and extends in a longitudinal direction; and a housing that is formed so as to extend in the longitudinal direction and surround the sensor element. The sensor element includes a front end portion and a rear end portion. The heater includes a heat generation portion and a lead portion. The heat generation portion has a front end and a rear end, and is positioned on the same side as the front end portion side of the sensor element. The housing includes an enlarged diameter portion that is formed so that a diameter of an inner wall of the housing increases in a direction toward the front end of the sensor, in a cross section that is parallel to an axis that extends in the longitudinal direction. The enlarged diameter portion includes a front end portion and a rear end portion. The rear end of the heat generation portion is located closer to the front end of the sensor than the rear end portion of the enlarged diameter portion is.

In this configuration, the housing includes an enlarged diameter portion that is provided in the vicinity of the heat generation portion of the heater of the sensor element. Due to this enlarged diameter portion, the inner wall of the housing is formed so that the distance between the inner wall of the housing and the sensor element increases in the direction toward the front end of the sensor. In addition, the rear end portion of the enlarged diameter portion is located closer to the rear end of the sensor than the rear end of the heat generation portion of the heater is. With this configuration, even if water flows to the inner wall of the housing and drips from the rear end portion of the enlarged diameter portion, the heat generation portion of the heater is located closer to the front end of the sensor than this rear end portion is, thereby preventing the water dripping from the inner wall of the housing (the rear end portion of the enlarged diameter portion) from splashing onto the heating portion of the heater. Therefore, with the sensor according with such a configuration, it is possible to lower the probability of the heater portion of the sensor element being exposed to water.

In the sensor according to the above-described one aspect, the enlarged diameter portion may be formed so as to have a shape with a taper in the cross section. The angle of the taper may be no less than 10 degrees and less than 90 degrees. The angle of the taper may be no less than 20 degrees and less than 90 degrees. Alternatively, the angle of the taper may be no less than 30 degrees and less than 90 degrees. With any of these configurations, it is possible to desirably lower the probability of the heater portion of the sensor element being exposed to water.

In the sensor according to the above-described one aspect, the enlarged diameter portion may be formed so as to have a rounded shape in the cross section. With this configuration, it is possible to desirably lower the probability of the heater portion of the sensor element being exposed to water.

The sensor according to the above-described one aspect may further include a protective cover that extends in the longitudinal direction and surrounds at least a portion of the enlarged diameter portion of the housing, and is formed so as to extend beyond the front end portion of the sensor element. With this configuration, due to the protective cover, it is possible to lower the probability of the housing and the sensor element being exposed to water.

In the sensor according to the above-described one aspect, the sensor element may have a porous protective layer that covers at least a portion of the sensor element. With this configuration, due to the presence of the porous protective layer, it is possible to improve the strength of the sensor element while lowering the effect of water when the sensor element is exposed to water.

In the sensor according to the above-described one aspect, the sensor element may be a gas sensor element. With this configuration, it is possible to provide a gas sensor in which the probability of the heater portion being exposed to water is lowered.

According to the present invention, it is possible to provide a sensor in which the probability of the heater portion of the sensor element being exposed to water is lowered.

EMBODIMENTS OF THE INVENTION

Hereinafter, an embodiment according to one aspect of the present invention (hereinafter, also referred to as "the present embodiment") will be described with reference to the drawings. However, the present embodiment described below is merely an example of the present invention in all respects. Needless to say, various improvements and modifications may be made without departing from the scope of the present invention. That is to say, when carrying out the present invention, any specific configuration may be appropriately employed according to the embodiment.

[Configuration Example]

Figure 1:
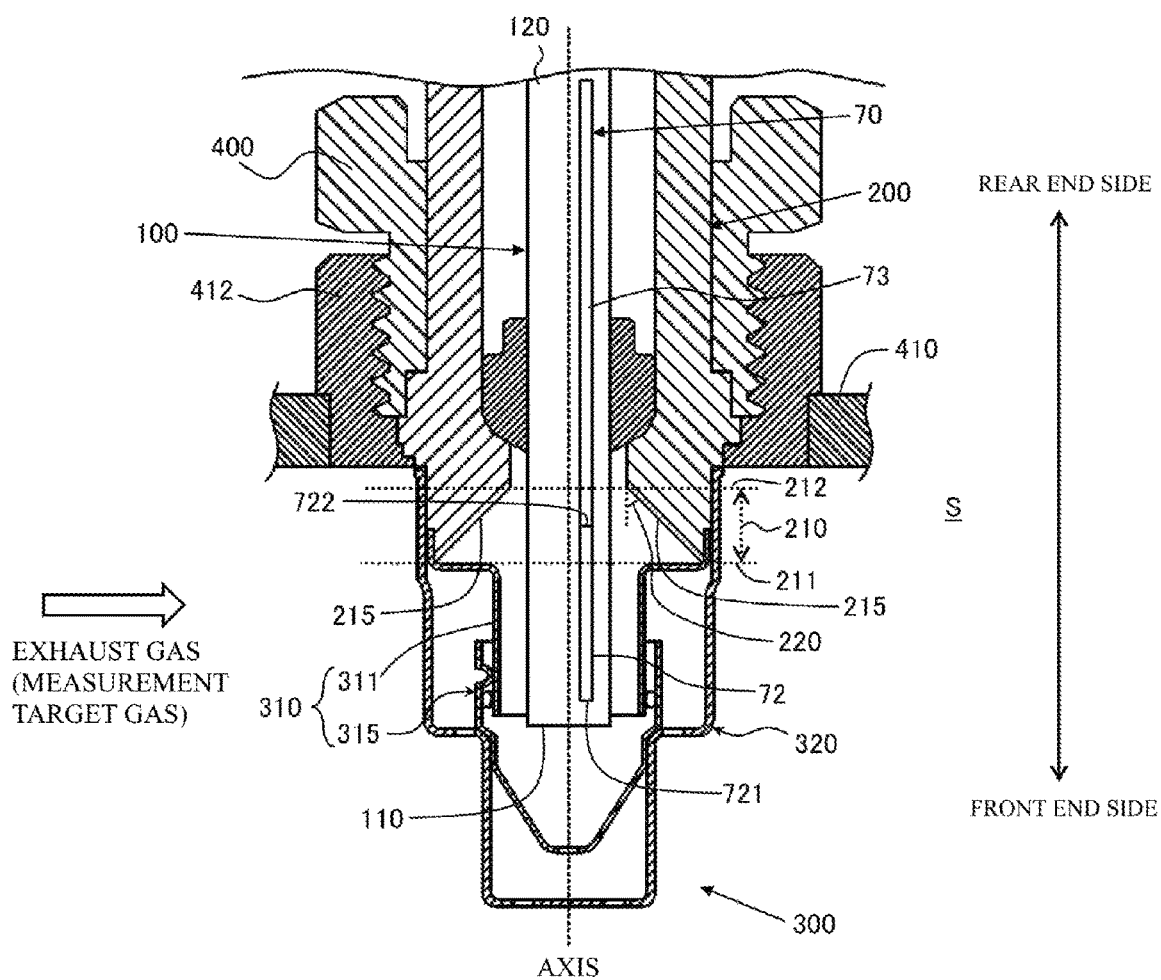
FIG. 1 is a schematic cross-sectional view schematically showing an example of a configuration of a sensor according to an embodiment.

FIG. 1 is a schematic cross-sectional view schematically showing an example of a configuration of a sensor S according to the present embodiment. The sensor S has an axis, and is formed so as to extend in the longitudinal direction (the axial direction). FIG. 1 schematically shows the configuration of a cross section that is parallel to and in contact with the axial line in the longitudinal direction (a line that extends in the vertical direction in the figure). The sensor S has a front end and a rear end as the ends in the longitudinal direction. One end in the longitudinal direction is the front end, and the other end is the rear end. In the example in FIG. 1, the sensor S is positioned so that the front end of the sensor S faces downward and the rear end of the sensor S faces upward. That is to say, the vertical direction in FIG. 1 corresponds to the longitudinal direction (the axial direction). In the present embodiment, the sensor S includes a sensor element 100, a housing 200, and a protective cover 300.

(Sensor Element)

The sensor element 100 includes a built-in heater 70, and is formed so as to extend in the longitudinal direction (the vertical direction in FIG. 1). The sensor element 100 includes a front end portion 110 and a rear end portion 120 as two end portions in the longitudinal direction. The sensor element 100 is positioned so that the front end portion 110 faces toward the front end of the sensor S. The heater 70 includes a heat generation portion 72 and a lead portion 73. The heat generation portion 72 has a front end 721 and a rear end 722 as the ends in the longitudinal direction. The heat generation portion 72 on the same side as the front end portion 110 side of the sensor element 100 so that the front end 721 of the heat generation portion 72 faces toward the front end portion 110 of the sensor element 100. The lead portion 73 is coupled to the rear end 722 of the heat generation portion 72, and is positioned on the same side as the rear end portion 120 side of the sensor element 100.

In the example in FIG. 1, the sensor element 100 is formed in a rectangular shape, but the shape of the sensor element 100 is not limited to such an example. The shape of the sensor element 100 may be appropriately selected according to the embodiment. In addition, the type of the sensor element 100 is not particularly limited, and may be appropriately selected according to the embodiment. In one example, the sensor element 100 may be a gas sensor element, and accordingly the sensor S may be configured to measure the concentration of a gas component. An example of the configuration of the sensor element 100 when the gas sensor element is employed as the sensor element 100 will be described in detail later.

(Housing)

The housing 200 is configure to extend in the longitudinal direction and surround the sensor element 100. In the example shown in FIG. 1, the housing 200 is formed in a tubular shape. As a result, the housing 200 is formed so as to house the sensor element 100 in the internal space thereof, and surround a range excluding a front end portion 110 side portion of the sensor element 100. However, the shape of the housing 200 is not limited to such an example. The housing 200 may be formed so as to surround a portion of the sensor element 100 as shown in FIG. 1, or may be formed so as to surround the entirety of the sensor element 100 in the longitudinal direction. The shape of the housing 200 is not limited and may be appropriately selected according to the embodiment if the housing 200 is formed so as to surround at least a portion of the sensor element 100.

The housing 200 has a front end and a rear end as the ends in the longitudinal direction, and is positioned so that the front end of the housing 200 faces toward the front end of the sensor S. The housing 200 includes an enlarged diameter portion 210 that is configured so that the diameter of an inner wall 215 of the housing 200 increases toward the front end of the sensor S in a cross section parallel to the longitudinal axis shown in FIG. 1. The inner wall 215 of the housing 200 is the inner wall of the housing 200 and faces the sensor element 100 housed in the internal space of the housing 200.

The enlarged diameter portion 210 is positioned on the same side as the front end side of the housing 200. In addition, the enlarged diameter portion 210 includes a front end portion 211 and a rear end portion 212 as two end portions in the longitudinal direction, and the front end portion 211 of the enlarged diameter portion 210 is positioned so as to face toward the front end of the sensor S. Note that, when the enlarged diameter portion 210 is viewed from the rear end side to the front end side of the sensor S, the rear end portion 212 of the enlarged diameter portion 210 is at the position from which the diameter of the inner wall 215 starts to increase. Therefore, the rear end portion 212 may be referred to as the starting point of the enlarged diameter portion 210. In the present embodiment, the rear end portion 212 of the enlarged diameter portion 210 is located closer to the rear end of the sensor S than the rear end 722 of the heat generation portion 72 of the heater 70 is. That is to say, in the present embodiment, the rear end 722 of the heat generation portion 72 of the heater 70 is located closer to the front end of the sensor S than the rear end portion 212 of the enlarged diameter portion 210 is.

The shape of the enlarged diameter portion 210 may be appropriately determined according to the embodiment if the enlarged diameter portion 210 is configured so that the diameter of the inner wall 215 increases in the direction toward the front end of the sensor S, i.e., the distance in a direction orthogonal to the axis between the sensor element 100 and the inner wall 215 (the horizontal direction in FIG. 1) is larger at the rear end portion 212 than at the front end portion 211. In one example, as shown in FIG. 1, the cross-sectional shape of the enlarged diameter portion 210 in FIG. 1 may be a tapered shape. A taper angle 220 may be appropriately determined according to the embodiment. In one example, the taper angle 220 may be no less than 10 degrees and less than 90 degrees. In another example, the taper angle 220 may be no less than 20 degrees and less than 90 degrees. In yet another example, the taper angle 220 may be no less than 30 degrees and less than 90 degrees. In the cross section shown in FIG. 1, when it is assumed that the shape of the enlarged diameter portion 210 on the side that is closer to the rear end of the sensor S than the starting point of the enlarged diameter portion 210 (i.e., the rear end portion 212) of the enlarged diameter portion 210 is continues linearly to the front end side of this starting point, the taper angle 220 may be defined as the angle between this imaginary straight line and the inner wall 215 of the enlarged diameter portion 210.

In the example in FIG. 1, in the inner wall 215 of the portion other than the enlarged diameter portion 210, a portion that is continuous with the rear end portion 212 of the enlarged diameter portion 210 has the same diameter as the rear end portion 212, and a portion closer to the rear end of the sensor S than the continuous portion has a shape that is slightly widened so as to receive a supporting member of the sensor element 100. However, the shape and diameter of the inner wall 215 of a portion other than the enlarged diameter portion 210 is not limited to such an example, and may be appropriately determined according to the embodiment.

For example, a metal material such as stainless steel (for example, SUS) may be used as the material of the housing 200. The housing 200 may be manufactured by appropriately molding a metal material.

(Protective Cover)

The protective cover 300 is formed so as to extend in the longitudinal direction and surround at least a portion of the enlarged diameter portion 210 of the housing 200, and extend beyond the front end portion 110 of the sensor element 100. In the example in FIG. 1, the protective cover 300 has a substantially tubular shape, and is formed so as to surround front end-side portions of the sensor element 100 and the housing 200 around the axis. The protective cover 300 has a front end and a rear end as two ends in the longitudinal direction, and the front end of the protective cover is located closer to the front end of the sensor S than the front end portion 110 of the sensor element 100 is.

In one example, the configuration of the protective cover proposed in JP 2017-223619A may be employed as the configuration of the protective cover 300. Specifically, in the example in FIG. 1, the protective cover 300 includes an inner cover 310 and an outer cover 320. The inner cover 310 includes a first member 311 and a second member 315, and is formed so as to cover the front end portions of the sensor element 100 and the housing 200. The first member 311 is formed so as to extend in the longitudinal direction from the outer wall of the front end portion of the housing 200, decrease in diameter in the direction orthogonal to the longitudinal direction from a position beyond the front end portion of the housing 200, and thereafter extend further in the longitudinal direction. The second member 315 is formed so as to surround a front end-side portion of the first member 311. The outer cover 320 is formed so as to surround the inner cover 310. An opening is appropriately provided in the first member 311 and the second member 315 of the inner cover 310 and the outer cover 320, and thus the space in the front end portion 110 of the sensor element 100 communicates with the space outside the protective cover 300. However, the configuration and the shape of the protective cover 300 are not limited to such an example. The configuration and the shape of the protective cover 300 may be appropriately determined according to the embodiment.

For example, a metal material such as stainless steel (for example, SUS) may be used as the material of the protective cover 300. The protective cover 300 may be manufactured by appropriately molding a metal material. Note that this protective cover 300 may be omitted from the configuration of the sensor S.

(Example Dimensions)

The dimensions of the sensor element 100, the housing 200, and the protective cover 300 may be appropriately determined according to the embodiment. For example, a first distance between the rear end portion 212 of the enlarged diameter portion 210 of the housing 200 and the sensor element 100 (the length in the horizontal direction in FIG. 1/the distance between the inner wall 215 of the rear end portion 212 and the outer wall of the sensor element 100) may be 1 mm to 4 mm. A second distance between the front end portion 211 of the enlarged diameter portion 210 of the housing 200 and the sensor element 100 (the length in the horizontal direction in FIG. 1/the distance between the inner wall 215 of the front end portion 211 and the outer wall of the sensor element 100) may be longer than the first distance, and may be 2 mm to 6 mm.

(Example Usage)

The sensor S may be appropriately attached according to the embodiment. In one example, if a gas sensor element is employed as the sensor element 100, the sensor S may be attached to a pipe 410 that is an exhaust passage from the engine of the vehicle. In the example in FIG. 1, the sensor S is further provided with a metal nut 400 with a male thread on the outer circumference thereof. The nut 400 is fixed to the outer circumferential surface of the housing 200. The housing 200 is inserted together with the nut 400 into a fixing member 412 that is welded to the pipe 410 and has female threads on the inner surface thereof. The fixing member 412 is fixed to the pipe 410. The male thread of the nut 400 is screwed onto the female thread of the fixing member 412. As a result, the sensor S is fixed to the pipe 410 with the housing 200 and the fixing member 412 being interposed therebetween.

In one example, the sensor element 100 formed as a gas sensor element may measure the concentration of $NO_x$, $O_2$, or another component contained in the exhaust gas (gas to be measured) emitted from the engine. In the example in FIG. 1, the sensor S is fixed to the pipe 410 so that the front end portion 110 of the sensor element 100 faces downward in the state where the axis of the sensor S is orthogonal to the flow of exhaust gas in the pipe 410. Note that the attaching angle of the sensor S to the pipe 410 is not limited to such an example. The sensor S may be fixed to the pipe 410 with the axis of the sensor S tilted at a given angle with respect to the flow of the exhaust gas. The attaching angle of the sensor S may be, for example, set so that the front end portion 110 of the sensor element 100 faces an angle of 0 degrees to 80 degrees with respect to the vertical downward direction. The same attaching angle may also be employed in a case where the sensor element 100 is attached to a member other than the pipe 410, and a case where the sensor element 100 is constituted by a member other than the gas sensor element.

(Configuration of Sensor Element)

Figure 2:
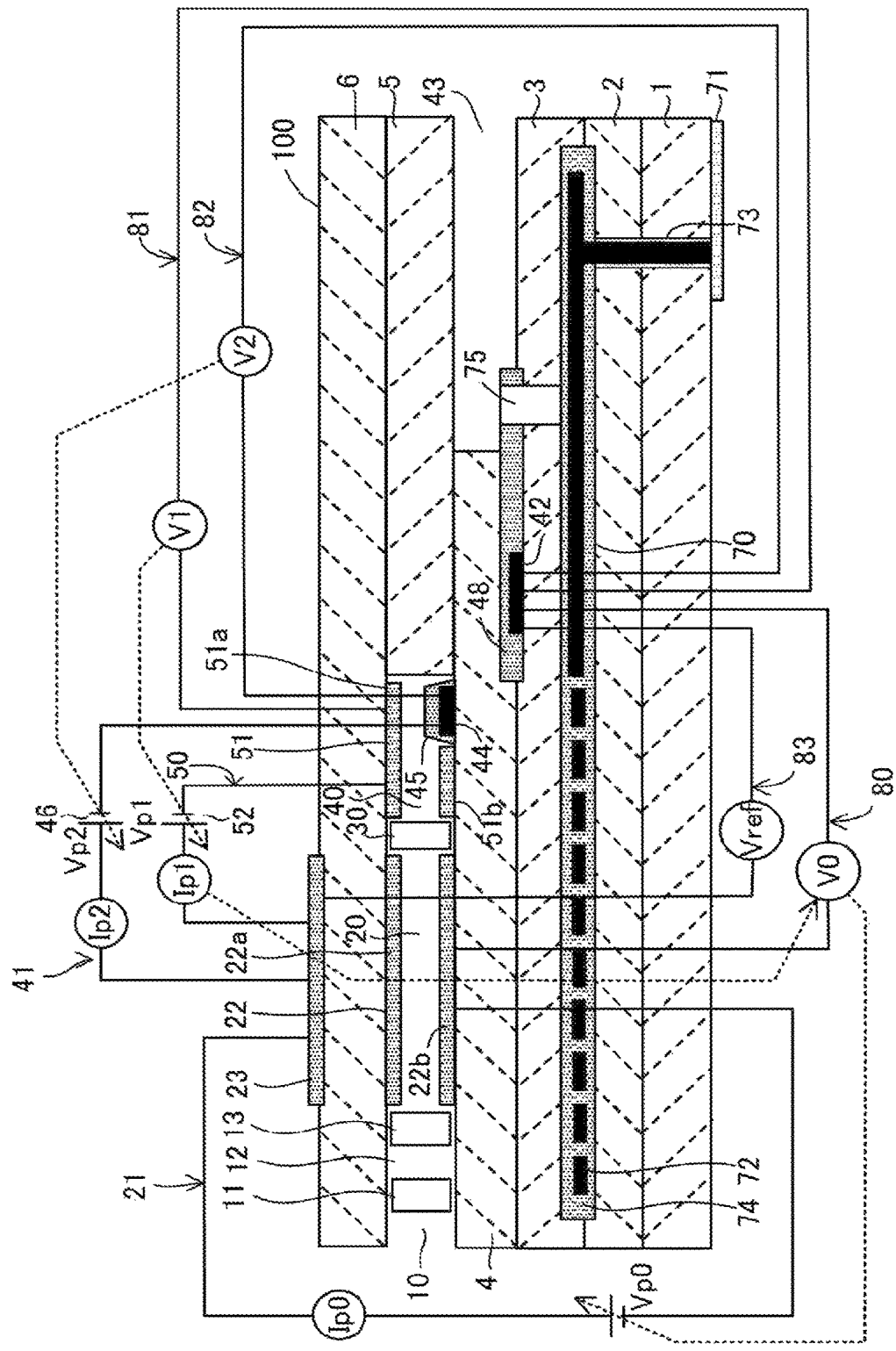
FIG. 2 is a schematic cross-sectional view schematically showing an example of a configuration of a sensor element according to the embodiment.

FIG. 2 is a cross-sectional schematic view schematically showing an example of the configuration of the sensor element 100 in the case where a gas sensor element is employed as the sensor element 100. The sensor element 100 has a structure in which six layers consisting of a first substrate layer 1, a second substrate layer 2, a third substrate layer 3, a first solid electrolyte layer 4, a spacer layer 5, and a second solid electrolyte layer 6 are stacked in this order from the lower side in the cross-sectional view of FIG. 2, the layers being each constituted by an oxygen ion-conductive solid electrolyte layer made of zirconia ($ZrO_2$) or the like. The solid electrolyte forming these six layers may be a dense and airtight material. "Dense and airtight" refers to a porosity of 5% or less. The sensor element 100 is produced by, for example, performing predetermined processing and printing of wiring patterns on, for example, ceramic green sheets corresponding to the respective layers, thereafter stacking the resultant layers, and integrating them through firing. For example, the sensor element 100 is a stacked body constituted by a plurality of ceramic layers.

In the front end portion of the sensor element 100, a gas introduction opening 10, a first diffusion control unit 11, a buffer space 12, a second diffusion control unit 13, a first internal cavity 20, a third diffusion control unit 30, and a second internal cavity 40 are formed so as to be arranged in this order adjacent to each other in a connected manner between the lower face of the second solid electrolyte layer 6 and the upper face of the first solid electrolyte layer 4.

The gas introduction opening 10, the buffer space 12, the first internal cavity 20, and the second internal cavity 40 are spaces inside the sensor element 100, the spaces being each formed by cutting out the spacer layer 5, and each having an upper portion defined by the lower face of the second solid electrolyte layer 6, a lower portion defined by the upper face of the first solid electrolyte layer 4, and side portions defined by the side faces of the spacer layer 5.

The first diffusion control unit 11 is provided as two laterally long slits (whose openings have the longitudinal direction that is along the direction orthogonal to the section of the diagram). Each of the second diffusion control unit 13 and the third diffusion control unit 30 is provided as a hole whose length in the direction orthogonal to the section of the diagram is shorter than the first internal cavity 20 and the second internal cavity 40. The second diffusion control unit 13 and the third diffusion control unit 30 will be described in detail later. Note that the region from the gas introduction opening 10 to the second internal cavity 40 is also referred to as a gas flow passage.

A reference gas introduction space 43 having side portions defined by the side faces of the first solid electrolyte layer 4 is provided between the upper face of the third substrate layer 3 and the lower face of the spacer layer 5, at a position that is farther from the front side than the gas flow passage is. For example, air is introduced into the reference gas introduction space 43. However, the configuration of the sensor element 100 is not limited to such an example. In another example, the first solid electrolyte layer 4 may be formed so as to extend to the rear end of the sensor element 100, and the reference gas introduction space 43 may be omitted. In such a case, an air introduction layer 48 may be formed so as to extend to the rear end of the sensor element 100.

An air introduction layer 48 is a layer made of porous alumina, and is formed so that reference gas is introduced into the air introduction layer 48 via the reference gas introduction space 43. In addition, the air introduction layer 48 is formed so as to cover a reference electrode 42.

The reference electrode 42 is formed so as to be held between the upper face of the third substrate layer 3 and the first solid electrolyte layer 4, and the air introduction layer 48 that is continuous with the above-described reference gas introduction space 43 is provided therearound. The reference electrode 42 is used to measure the oxygen concentration (oxygen partial pressure) in the first internal cavity 20 or the second internal cavity 40. The details thereof will be described later.

In the gas flow passage, the gas introduction opening 10 is a region that is open to the external space. The sensor element 100 is configured to introduce measurement target gas from the external space via the gas introduction opening 10 into the sensor element 100.

The first diffusion control unit 11 is a region that applies a predetermined diffusion resistance to the measurement target gas introduced from the gas introduction opening 10.

The buffer space 12 is a space that is provided in order to guide the measurement target gas introduced from the first diffusion control unit 11 to the second diffusion control unit 13.

The second diffusion control unit 13 is a region that applies a predetermined diffusion resistance to the measurement target gas introduced from the buffer space 12 into the first internal cavity 20.

When the measurement target gas is introduced from the outside of the sensor element 100 into the first internal cavity 20, the measurement target gas abruptly introduced from the gas introduction opening 10 into the sensor element 100 due to a change in the pressure of the measurement target gas in the external space (a pulsation of the exhaust pressure in the case in which the measurement target gas is exhaust gas of an automobile) is not directly introduced into the first internal cavity 20, but is introduced into the first internal cavity 20 after passing through the first diffusion control unit 11, the buffer space 12, and the second diffusion control unit 13 where a change in the concentration of the measurement target gas is canceled. Accordingly, a change in the concentration of the measurement target gas introduced into the first internal cavity is reduced to be almost negligible.

The first internal cavity 20 is provided as a space for adjusting the oxygen partial pressure in the measurement target gas introduced via the second diffusion control unit 13. The oxygen partial pressure is adjusted through an operation of a main pump cell 21.

The main pump cell 21 is an electro-chemical pump cell constituted by an internal pump electrode 22 having a ceiling electrode portion 22a provided over substantially the entire lower face of the second solid electrolyte layer 6 that faces the first internal cavity 20, an external pump electrode 23 provided so as to be exposed to the external space in the region corresponding to the ceiling electrode portion 22a on the upper face of the second solid electrolyte layer 6, and the second solid electrolyte layer 6 held between these electrodes.

The internal pump electrode 22 is formed across upper and lower solid electrolyte layers (the second solid electrolyte layer 6 and the first solid electrolyte layer 4) that define the first internal cavity 20, and the spacer layer 5 that forms side walls. Specifically, the ceiling electrode portion 22a is formed on the lower face of the second solid electrolyte layer 6 that forms the ceiling face of the first internal cavity 20, a bottom electrode portion 22b is formed on the upper face of the first solid electrolyte layer 4 that forms the bottom face. Side electrode portions (not shown) that connect the ceiling electrode portion 22a and the bottom electrode portion 22b are formed on side wall faces (inner faces) of the spacer layer 5 that form two side wall portions of the first internal cavity 20. The internal pump electrode 22 is provided in the form of a tunnel at the region in which the side electrode portions are provided.

The internal pump electrode 22 and the external pump electrode 23 are formed as porous cermet electrodes (e.g., cermet electrodes made of Pt and $ZrO_2$ containing 1% of Au). Note that the internal pump electrode 22 with which the measurement target gas is brought into contact is made of a material that has a lowered capability of reducing a nitrogen oxide ($NO_x$) component in the measurement target gas.

The sensor element 100 is configured to, in the main pump cell 21, apply a desired pump voltage Vp0 to a point between the internal pump electrode 22 and the external pump electrode 23, thereby causing a pump current Ip0 to flow in the positive direction or the negative direction between the internal pump electrode 22 and the external pump electrode 23, so that oxygen in the first internal cavity 20 is pumped out to the external space or oxygen in the external space is pumped into the first internal cavity 20.

Furthermore, in order to detect the oxygen concentration (oxygen partial pressure) in the atmosphere in the first internal cavity 20, the internal pump electrode 22, the second solid electrolyte layer 6, the spacer layer 5, the first solid electrolyte layer 4, the third substrate layer 3, and the reference electrode 42 constitute a main pump-controlling oxygen partial pressure detection sensor cell 80 (i.e., an electro-chemical sensor cell).

The sensor element 100 is configured to be able to specify the oxygen concentration (oxygen partial pressure) in the first internal cavity 20 by measuring an electromotive force V0 in the main pump-controlling oxygen partial pressure detection sensor cell 80. Furthermore, the pump current Ip0 is controlled by performing feedback control on Vp0 such that the electromotive force V0 is kept constant. Accordingly, the oxygen concentration in the first internal cavity 20 can be kept at a predetermined constant value.

The third diffusion control unit 30 is a region that applies a predetermined diffusion resistance to the measurement target gas whose oxygen concentration (oxygen partial pressure) has been controlled through an operation of the main pump cell 21 in the first internal cavity 20, thereby guiding the measurement target gas to the second internal cavity 40.

The second internal cavity 40 is provided as a space for performing processing regarding measurement of the concentration of nitrogen oxide in the measurement target gas introduced via the third diffusion control unit 30. The $NO_x$ concentration is measured mainly in the second internal cavity 40 whose oxygen concentration has been adjusted by an auxiliary pump cell 50, through an operation of a measurement pump cell 41.

The sensor element 100 is configured so that, in the second internal cavity 40, the measurement target gas subjected to adjustment of the oxygen concentration (oxygen partial pressure) in advance in the first internal cavity 20 and then introduced via the third diffusion control unit is further subjected to adjustment of the oxygen partial pressure by the auxiliary pump cell 50. Accordingly, the oxygen concentration in the second internal cavity 40 can be precisely kept at a constant value, and thus the gas sensor 100 can measure the $NO_x$ concentration with a high level of precision.

The auxiliary pump cell 50 is an auxiliary electro-chemical pump cell constituted by an auxiliary pump electrode 51, the external pump electrode 23 (which is not limited to the external pump electrode 23, and may be any appropriate electrode outside the sensor element 100), and the second solid electrolyte layer 6. The auxiliary pump electrode 51 has a ceiling electrode portion 51a provided on substantially the entire lower face of the second solid electrolyte layer 6 that faces the second internal cavity 40.

The auxiliary pump electrode 51 with this configuration is provided inside the second internal cavity 40 in the form of a tunnel as with the above-described internal pump electrode 22 provided inside the first internal cavity 20. That is to say, the ceiling electrode portion 51a is formed on the second solid electrolyte layer 6 that forms the ceiling face of the second internal cavity 40, and a bottom electrode portion 51b is formed on the first solid electrolyte layer 4 that forms the bottom face of the second internal cavity 40. Side electrode portions (not shown) that connect the ceiling electrode portion 51a and the bottom electrode portion 51b are formed on two wall faces of the spacer layer 5 that form side walls of the second internal cavity 40. As a result, the auxiliary pump electrode 51 has a tunnel-shaped structure.

Note that the auxiliary pump electrode 51 is also made of a material that has a lowered capability of reducing a nitrogen oxide component in the measurement target gas, as with the internal pump electrode 22.

The sensor element 100 is configured to, in the auxiliary pump cell 50, apply a desired voltage Vp1 to a point between the auxiliary pump electrode 51 and the external pump electrode 23, so that oxygen in the atmosphere in the second internal cavity 40 is pumped out to the external space or oxygen in the external space is pumped into the second internal cavity 40.

Furthermore, in order to control the oxygen partial pressure in the atmosphere in the second internal cavity 40, the auxiliary pump electrode 51, the reference electrode 42, the second solid electrolyte layer 6, the spacer layer 5, the first solid electrolyte layer 4, and the third substrate layer 3 constitute that is, an auxiliary pump-controlling oxygen partial pressure detection sensor cell 81 (i.e., an electro-chemical sensor cell).

Note that the auxiliary pump cell 50 performs pumping using a variable power source 52 whose voltage is controlled based on an electromotive force V1 detected by the auxiliary pump-controlling oxygen partial pressure detection sensor cell 81. Accordingly, the oxygen partial pressure in the atmosphere in the second internal cavity 40 is controlled to be a partial pressure that is low enough to not substantially affect the $NO_x$ measurement.

Furthermore, a pump current Ip1 is used to control the electromotive force of the main pump-controlling oxygen partial pressure detection sensor cell 80. Specifically, the pump current Ip1 is input as a control signal to the main pump-controlling oxygen partial pressure detection sensor cell 80, and the electromotive force V0 is controlled such that a gradient of the oxygen partial pressure in the measurement target gas that is introduced from the third diffusion control unit 30 into the second internal cavity 40 is always kept constant. When the sensor is used as an $NO_x$ sensor, the oxygen concentration in the second internal cavity 40 is kept at a constant value that is about 0.001 ppm through an operation of the main pump cell 21 and the auxiliary pump cell 50.

The measurement pump cell 41 measures the concentration of nitrogen oxide in the measurement target gas, in the second internal cavity 40. The measurement pump cell 41 is an electro-chemical pump cell constituted by a measurement electrode 44, the external pump electrode 23, the second solid electrolyte layer 6, the spacer layer 5, and the first solid electrolyte layer 4. The measurement electrode 44 is located so as to be spaced away from the third diffusion control unit 30, on the upper face of the first solid electrolyte layer 4 that faces the second internal cavity 40.

The measurement electrode 44 is a porous cermet electrode. The measurement electrode 44 functions also as an $NO_x$ reduction catalyst for reducing $NO_x$ that is present in the atmosphere in the second internal cavity 40. Furthermore, the measurement electrode 44 is covered by a fourth diffusion control unit 45.

The fourth diffusion control unit 45 is a membrane constituted by a porous member mainly made of alumina ($Al_2O_3$). The fourth diffusion control unit 45 serves to limit the amount of $NO_x$ flowing into the measurement electrode 44, and also functions as a protective membrane of the measurement electrode 44.

The sensor element 100 is configured to, in the measurement pump cell 41, pump out oxygen generated through degradation of nitrogen oxide in the atmosphere around the measurement electrode 44, and detect the generated amount as a pump current Ip2.

Furthermore, in order to detect the oxygen partial pressure around the measurement electrode 44, the second solid electrolyte layer 6, the spacer layer 5, the first solid electrolyte layer 4, the third substrate layer 3, the measurement electrode 44, and the reference electrode 42 constitute a measurement pump-controlling oxygen partial pressure detection sensor cell 82 (i.e., an electro-chemical sensor cell). A variable power source 46 is controlled based on a volage (electromotive force) V2 detected by the measurement pump-controlling oxygen partial pressure detection sensor cell 82.

The measurement target gas guided into the second internal cavity 40 passes through the fourth diffusion control unit 45 and reaches the measurement electrode 44 in a state in which the oxygen partial pressure is controlled. Nitrogen oxide in the measurement target gas around the measurement electrode 44 is reduced to generate oxygen ($2NO \rightarrow N_2+O_2$). The generated oxygen is pumped by the measurement pump cell 41, and, at that time, a voltage Vp2 of the variable power source is controlled such that a control voltage V2 detected by the measurement pump-controlling oxygen partial pressure detection sensor cell 82 is kept constant. The amount of oxygen generated around the measurement electrode 44 is proportional to the concentration of nitrogen oxide in the measurement target gas, and thus it is possible to calculate the concentration of nitrogen oxide in the measurement target gas, using the pump current Ip2 in the measurement pump cell 41.

Furthermore, if the measurement electrode 44, the first solid electrolyte layer 4, the third substrate layer 3, and the reference electrode 42 are combined to constitute an oxygen partial pressure detection means as an electro-chemical sensor cell, it is possible to detect an electromotive force that corresponds to a difference between the amount of oxygen generated through reduction of an $NO_x$ component in the atmosphere around the measurement electrode 44 and the amount of oxygen contained in reference air can be detected. Thus, it is also possible to obtain the concentration of the nitrogen oxide component in the measurement target gas.

Furthermore, the second solid electrolyte layer 6, the spacer layer 5, the first solid electrolyte layer 4, the third substrate layer 3, the external pump electrode 23, and the reference electrode 42 constitute an electro-chemical sensor cell 83. The sensor element 100 is configured to detect the oxygen partial pressure in the measurement target gas outside the sensor, based on an electromotive force Vref obtained by the sensor cell 83.

In the sensor element 100 with this configuration, when the main pump cell 21 and the auxiliary pump cell 50 operate, the measurement target gas whose oxygen partial pressure is always kept at a constant low value (a value that does not substantially affect the $NO_x$ measurement) can be supplied to the measurement pump cell 41. Accordingly, the sensor element 100 is configured to specify the concentration of nitrogen oxide in the measurement target gas, based on the pump current Ip2 that flows when oxygen generated through reduction of $NO_x$ is pumped out by the measurement pump cell 41, substantially in proportion to the concentration of nitrogen oxide in the measurement target gas.

Furthermore, in order to improve the oxygen ion conductivity of the solid electrolyte, the sensor element 100 includes the heater 70 that serves to adjust the temperature of the sensor element 100 through heating and heat retention. In the example in FIG. 2, the heater 70 includes a heater electrode 71, a heater insulating layer 74, and a pressure dispersing hole 75 in addition to the heat generation portion 72 and the lead portion 73 described above. The lead portion 73 may be constituted by a through-hole. The heater 70 is located closer to the lower ace of the sensor element 100 than to the upper face of the sensor element 100 in the thickness direction of the sensor element 100. Note that the upper face of the sensor element 100 is the upper face of the second solid electrolyte layer 6, and the lower face of the sensor element 100 is the lower face of the first substrate layer 1.

The heater electrode 71 is an electrode formed so as to be in contact with the lower face of the first substrate layer 1. When the heater electrode 71 is connected to an external power source, electricity can be supplied from the outside to the heater unit 70.

The heat generation portion 72 is an electrical resistor formed so as to be held between the second substrate layer 2 and the third substrate layer 3 from above and below. The heat generation portion 72 is connected via the lead portion 73 to the heater electrode 71, and, when electricity is supplied from the outside via the heater electrode 71, the heat generation portion 72 generates heat, thereby heating and keeping the temperature of a solid electrolyte constituting the sensor element 100.

Furthermore, the heat generation portion 72 is embedded over the entire region from the first internal cavity 20 to the second internal cavity 40, and thus the entire sensor element 100 can be adjusted to a temperature at which the above-described solid electrolyte is activated.

The heater insulating layer 74 is an insulating layer constituted by an insulating member made of alumina or the like on the upper and lower faces of the heat generation portion 72. The heater insulating layer 74 is formed in order to realize the electrical insulation between the second substrate layer 2 and the heat generation portion 72 and the electrical insulation between the third substrate layer 3 and the heat generation portion 72.

The pressure dispersing hole 75 is a hole that extends through the third substrate layer 3 and is connected to the reference gas introduction space 43, and is formed in order to alleviate an increase in the internal pressure in accordance with an increase in the temperature in the heater insulating layer 74.

(Characteristics)

As described above, in the sensor S according to the present embodiment, the housing 200 includes the enlarged diameter portion 210 that is provided in the vicinity of the heat generation portion 72 of the heater 70 of the sensor element 100. Due to this enlarged diameter portion 210, the distance between the inner wall 215 of the housing 200 and the sensor element 100 increases in the direction toward the front end of the sensor S (i.e., the inner wall 215 is inclined away from the sensor element 100). In addition, the rear end portion 212 of the enlarged diameter portion 210 is located closer to the rear end of the sensor S than the rear end 722 of the heat generation portion 72 of the heater 70 is. With this configuration, even if water flows to the inner wall 215 of the housing 200 and drips from the rear end portion 212 of the enlarged diameter portion 210, the heat generation portion 72 of the heater 70 is located closer to the front end of the sensor S than this rear end portion 212 is, thereby preventing the water dripping from the inner wall 215 of the housing 200 (the rear end portion 212 of the enlarged diameter portion 210) from splashing onto the heating portion 72 of the heater 70. Therefore, with the sensor S according to the present embodiment, it is possible to lower the probability of the heating portion 72 of the heater 70 of the sensor element 100 being exposed to water.

In addition, as shown in FIG. 1, the cross-sectional shape of the enlarged diameter portion 210 may be a tapered shape. The taper angle 220 may be no less than 10 degrees and less than 90 degrees, or no less than 20 degrees and less 90 degrees, or no less than 30 degrees and less than 90 degrees. As a result, as shown in the examples below, it is possible to desirably lower the probability of the heat generation portion 72 of the sensor element 100 being exposed to water. With the sensor S according to the present embodiment, due to the protective cover 300, it is possible to lower the probability of the housing 200 and the sensor element 100 being exposed to water. Furthermore, by employing the gas sensor element illustrated in FIG. 2 as the sensor element 100, it is possible to provide a gas sensor in which the probability of the heat generation portion 72 of the heater 70 being exposed to water is lowered.

[Modifications]

Although an embodiment of the present invention has been described above, the above description of the embodiment is merely an example of the present invention in all aspects. Various improvements and modifications may be made to the above embodiment. For each component of the above embodiment, the component may be omitted, replaced, or added as appropriate. In addition, the shape and dimensions of each component of the above embodiment may be appropriately changed according to the embodiment. For example, the following modifications can be made. In the following description, the same reference numerals will be used for the same components as those in the above embodiment, and the same points as in the above embodiment will be omitted as appropriate. The following modifications can be combined as appropriate.

(I) Shape of Enlarged Diameter Portion

In the example in FIG. 1 above, the enlarged diameter portion 210 of the housing 200 is formed so as to be tapered. However, the shape in which the diameter of the inner wall 215 increases toward the front end of the sensor S is not limited to such an example. In another example, the cross-sectional shape of the enlarged diameter portion may be formed so as to have a rounded shape.

Figure 3:
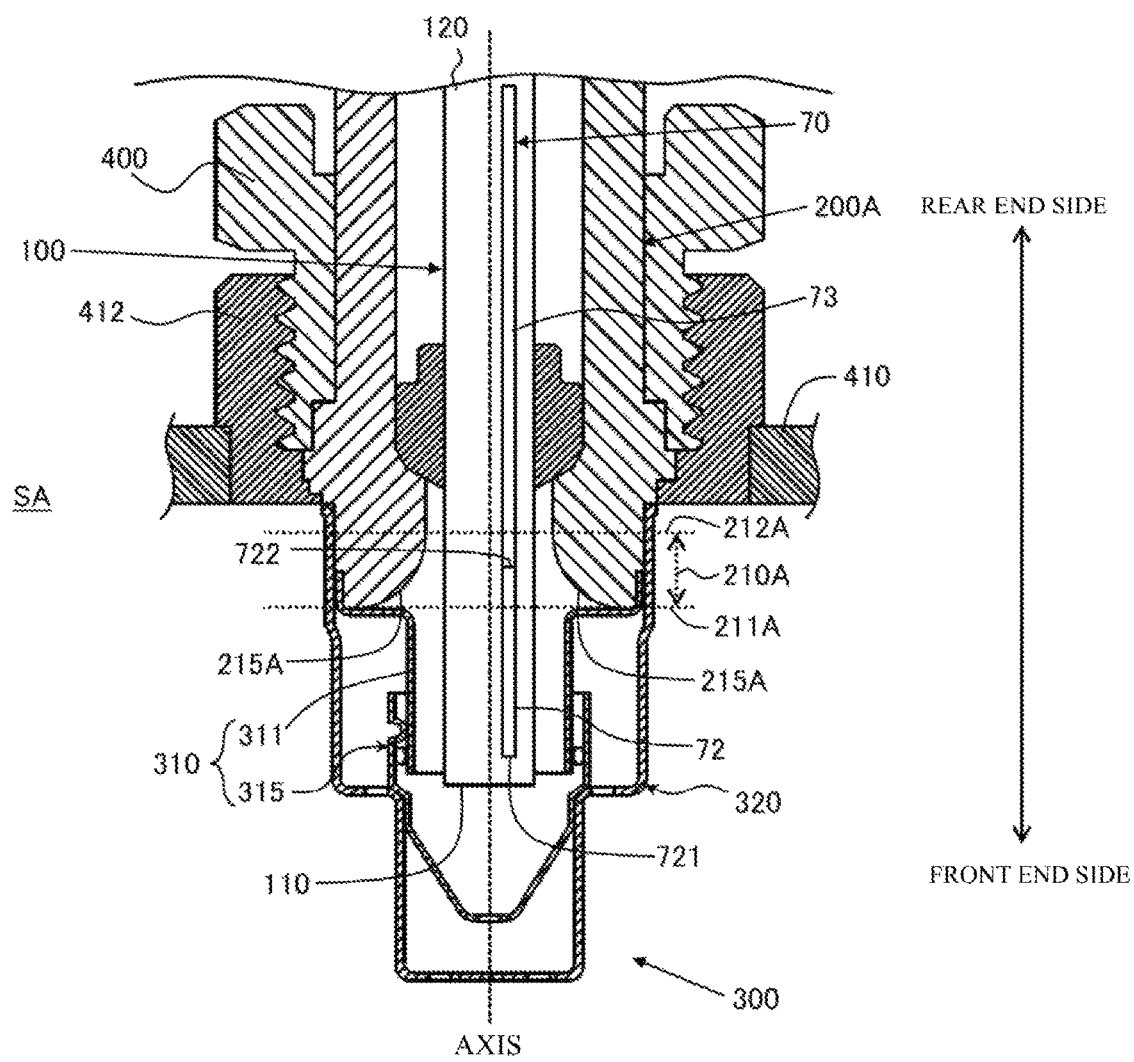
FIG. 3 is a schematic cross-sectional view schematically showing an example of a configuration of a sensor according to a modification.
Figure 4:
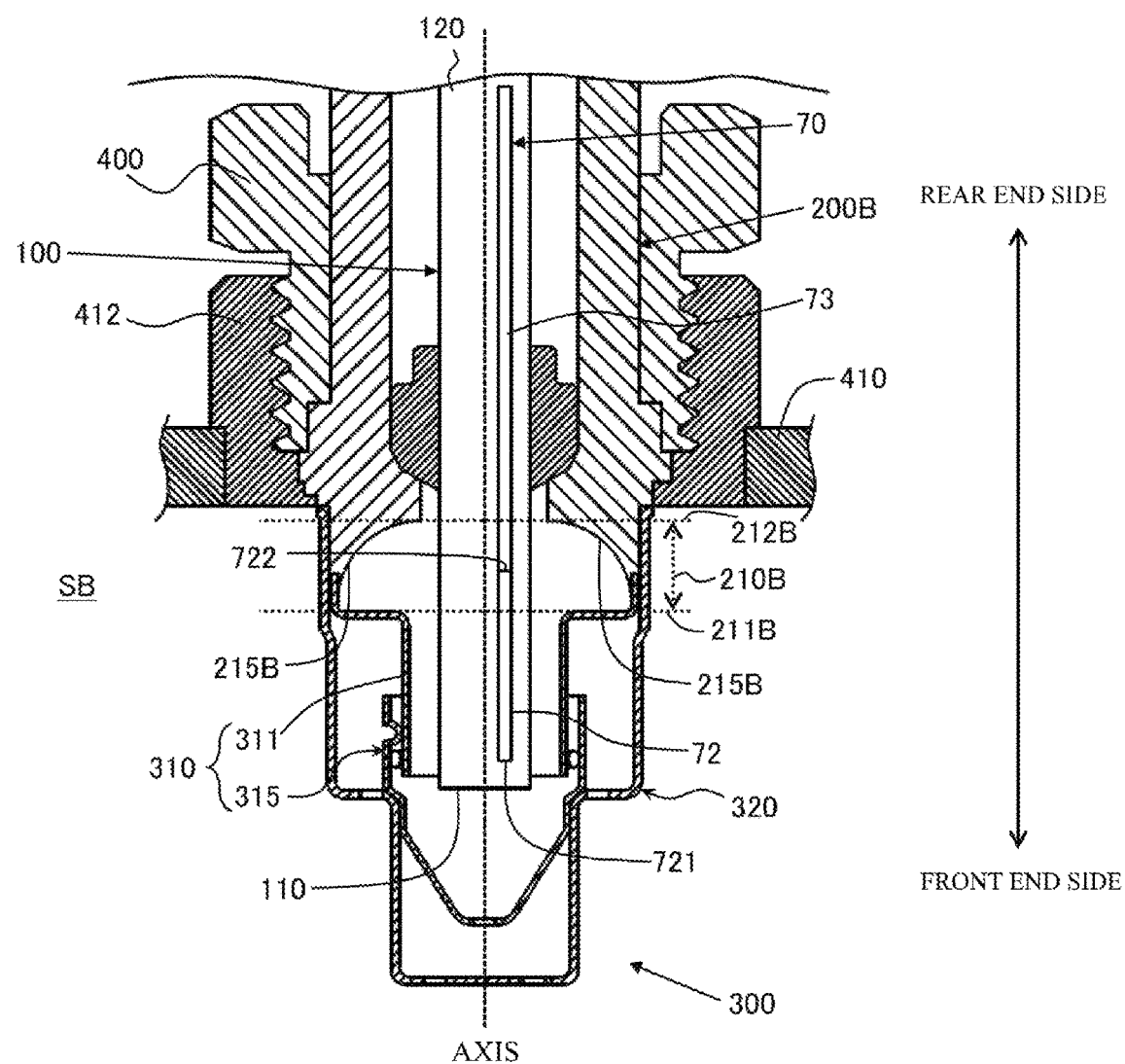
FIG. 4 is a schematic cross-sectional view schematically showing an example of a configuration of a sensor according to a modification.
Figure 6:
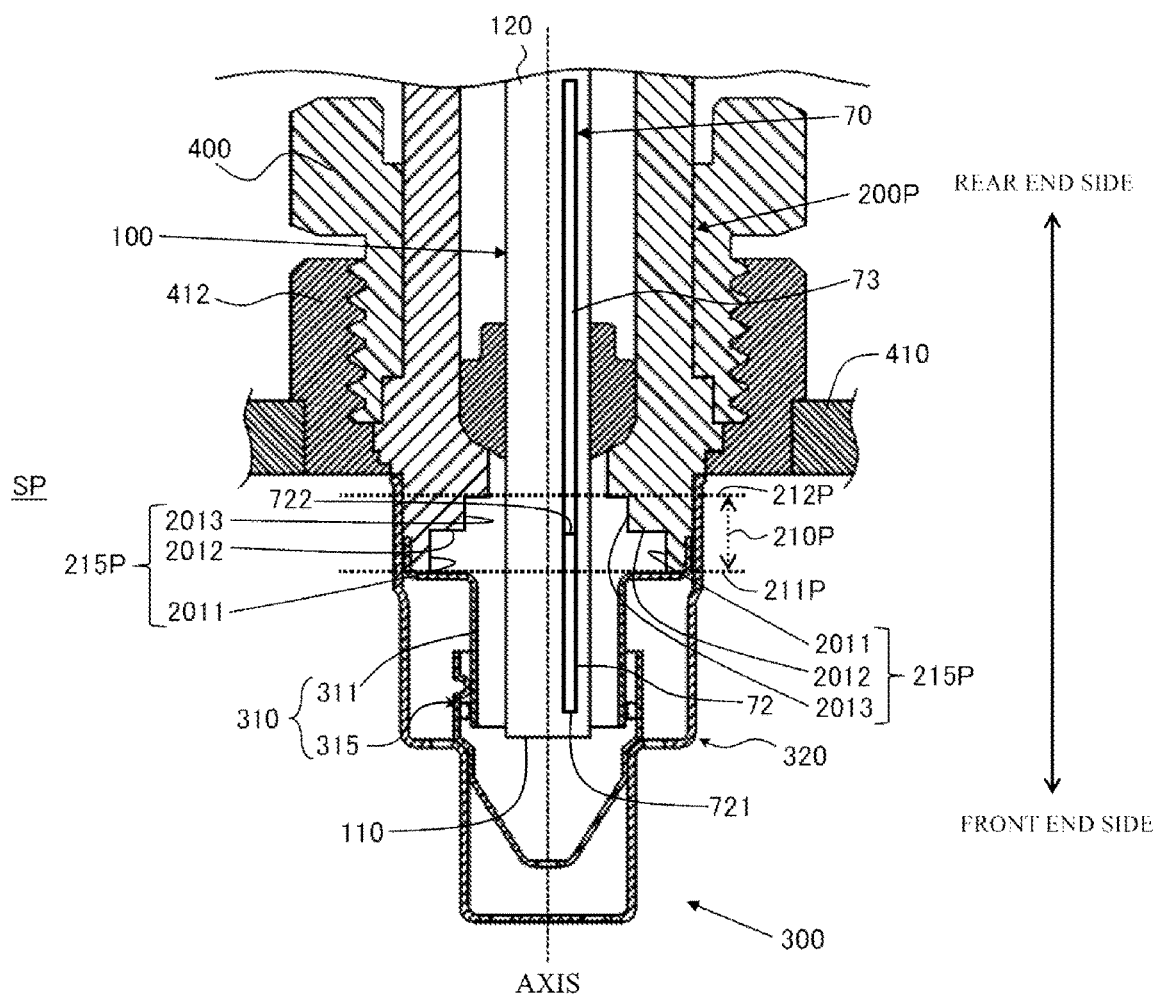
FIG. 6 is a schematic cross-sectional view schematically showing an example of a configuration of a sensor according to a modification.
Figure 7:
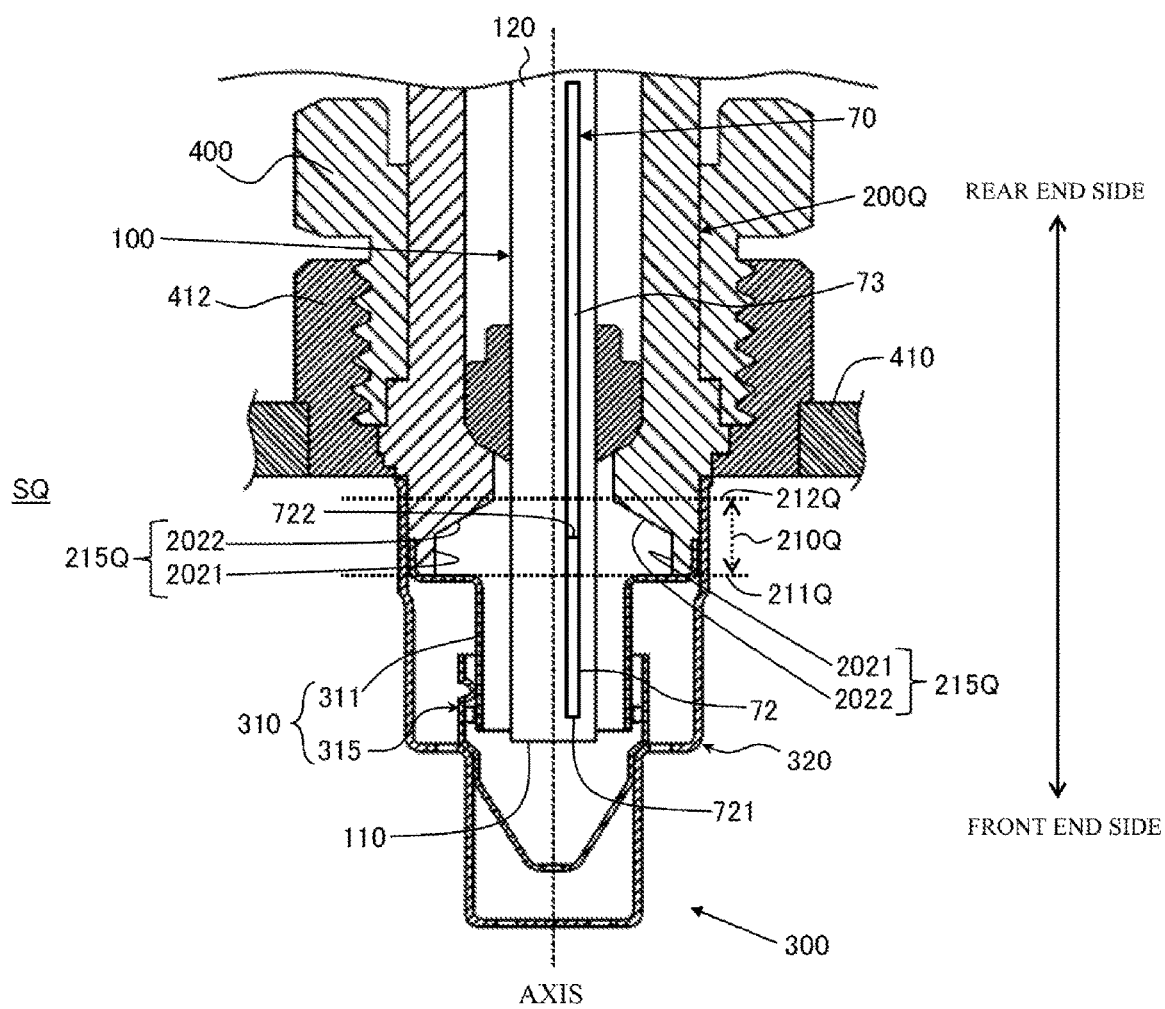
FIG. 7 is a schematic cross-sectional view schematically showing an example of a configuration of a sensor according to a modification.
Figure 8:
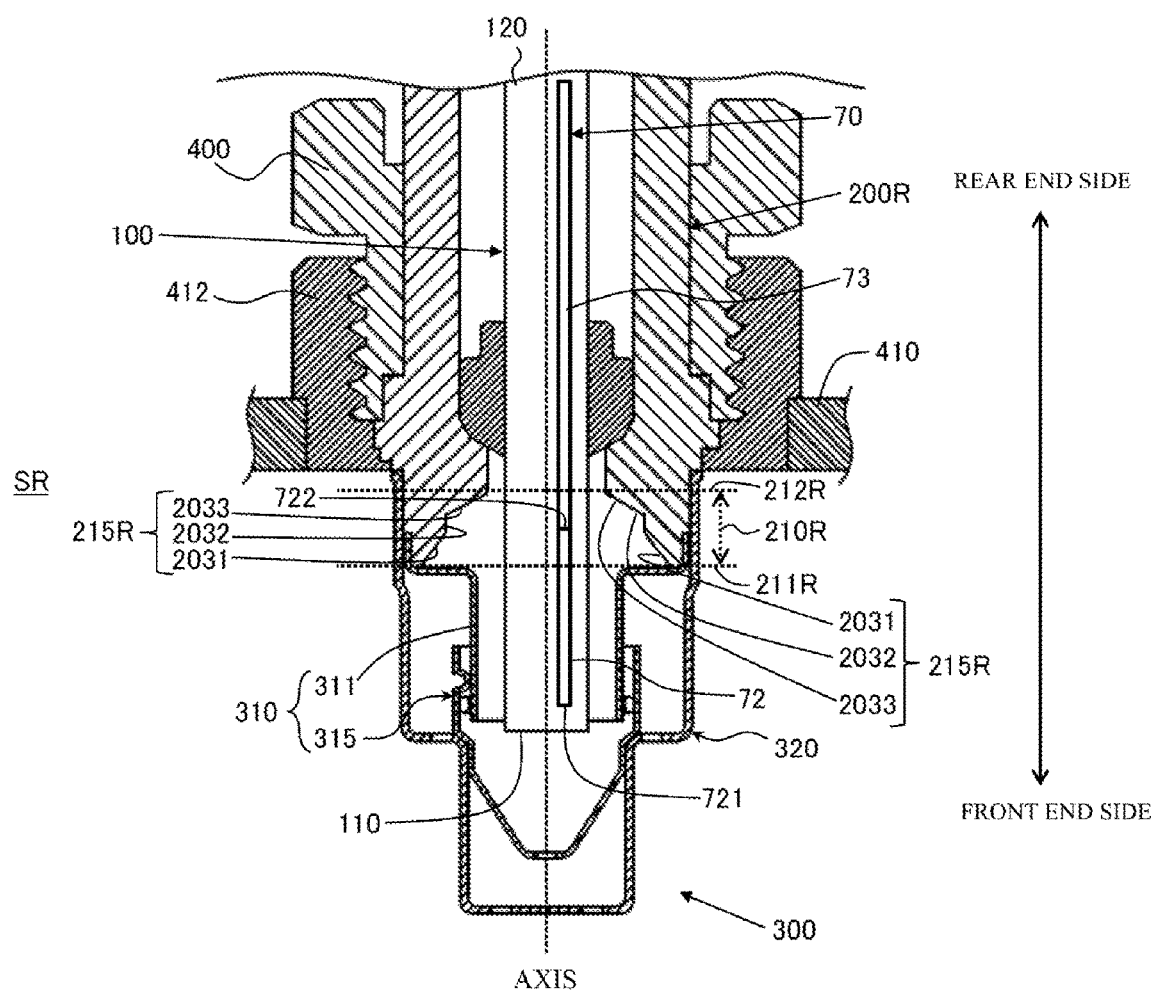
FIG. 8 is a schematic cross-sectional view schematically showing an example of a configuration of a sensor according to a modification.

FIGS. 3 and 4 are schematic cross-sectional views schematically showing examples of configurations of the sensors (SA, SB) according to this modification in which the enlarged diameter portion is formed so as to have a rounded shape. FIGS. 6 to 8 are schematic cross-sectional views schematically showing examples of configurations of sensors (SP, SQ, and SR) according to the present modification in which the inner wall of the enlarged diameter portion includes a plurality of straight portions, a straight portion and an inclined portion, or a plurality of inclined portions. As with FIG. 1, FIGS. 3, 4, and 6 to 8 schematically show the configurations of a cross section that is parallel to the longitudinal axis and is in contact with the axis. In the sensor SA shown in FIG. 3, an enlarged diameter portion 210A of a housing 200A is formed so that a rounded protrusion faces inward. That is to say, in comparison regarding the amount of increase of the diameter of an inner wall 215A in the axial direction, the amount of increase of the diameter of the inner wall 215A is larger at a position on a front end 211A side than at a position on a rear end 212A side of the enlarged diameter portion 210A. The dimensions of the rounded shape may be freely determined. In one example, when the inner wall 215A is regarded as an arc, the radius of curvature of the inner wall 215A of the enlarged diameter portion 210A may be 1 mm to 4 mm in the cross section in FIG. 3. In contrast, in a sensor SB shown in FIG. 4, an enlarged diameter portion 210B of a housing 200B is formed so that the rounded protrusion faces outward. That is to say, in comparison regarding the amount of increase of the diameter of an inner wall 215B in the axial direction, the amount of increase of the diameter of the inner wall 215B is larger at a position on a rear end 212B side than at a position on a front end 211B side of the enlarged diameter portion 210B. In other words, in the cross section in FIG. 4, the enlarged portion 210B has the shape of a cut out arc. The dimensions of this cut out arc may be freely determined. In one example, in the cross section in FIG. 4, the radius of curvature of the arc to be cut out may be 1 mm to 4 mm. Except for these points, the configuration of each sensor (SA, SB) may be the same as the sensor S above. With the sensor (SA, SB) according to the present modification, it is possible to desirably lower the probability of the heat generation portion 72 of the sensor element 100 being exposed to water, by forming the enlarged diameter portion (210A, 210B) in a rounded shape.

The shape in which the diameter of the inner wall increases in the direction toward the front end may be a shape in which the diameter of the inner wall increases step by step, that is, in a stepwise manner, from the rear end side to the front end side. For example, a plurality of straight portions with a constant inner wall diameter may be formed in the inner wall, as long as the diameter of the inner wall in the straight portion on the front side is wider (larger) than the diameter of the inner wall in the straight portion on the rear end side.

In a sensor SP illustrated in FIG. 6, an enlarged diameter portion 210P of a housing 200P is formed so that the diameter of an inner wall 215P increases step by step (i.e., in a stepwise manner) from a rear end 212P side to a front end 211P side. Specifically, in the enlarged diameter portion 210P, the inner wall 215P includes a straight portion 2011 and a straight portion 2013 where the inner wall 215P has a constant diameter. That is to say, the diameter of the inner wall 215P is constant in the straight portion 2011, and the diameter of the inner wall 215P is constant in the straight portion 2013. The straight portion 2013 is located closer to the rear end portion 212P of the enlarged diameter portion 210P than the straight portion 2011 is, i.e., the straight portion 2011 is located closer to the front end 211P of the enlarged diameter portion 210P than the straight portion 2013 is. The diameter of the inner wall 215P in the straight portion 2011 located on the front end 211P side is wider (larger) than the diameter of the inner wall 215P in the straight portion 2013 located on the rear end 212P side. That is to say, in comparison regarding the diameter of the inner wall 215P in the axial direction, the diameter of the inner wall 215P is larger in the straight portion 2011 than in the straight portion 2013. Therefore, in comparison regarding the amount of increase of the diameter of the inner wall 215P in the axial direction, the amount of increase of the diameter of the inner wall 215P is larger on the front end 211P side than on the rear end 212P side of the enlarged diameter portion 210P.

In the example shown in FIG. 6, an intermediate portion 2012 connecting the straight portion 2011 and the straight portion 2013 is orthogonal to each of the straight portions 2011 and 2013. More precisely, the inner wall 215P in the intermediate portion 2012 is orthogonal to each of the inner wall 215P in the straight portion 2011 and the inner wall 215P in the straight portion 2013. However, it is not essential that the intermediate portion 2012 is orthogonal to each of the straight portions 2011 and 2013. For example, the intermediate portion 2012 may be tilted with respect to each of the straight portions 2011 and 2013 so that the diameter of the inner wall 215P increases in the direction toward the front end 211P. Specifically, the intermediate portion 2012 (the inner wall 215P of the intermediate portion 2012) may be formed so as to be shown as a "straight line or curved line that is inclined with respect to the axial direction such that the diameter of the inner wall 215P increases in the direction toward the front end portion" in a cross section that is parallel to and is in contact with the axis.

FIG. 6 shows an example of an enlarged diameter portion in which a plurality of straight portions with a constant inner wall diameter are formed on the inner wall, and the diameter of the inner wall of the straight portion on the front end side is wider (larger) than the diameter of the inner wall of the straight section on the rear end side. However, the shape in which "the inner wall of the enlarged diameter portion includes a plurality of straight portions" is only one example of the shape of the enlarged diameter portion where the diameter of the inner wall increases in the direction toward the front end, and the inner wall of the enlarged diameter portion may include inclined portions. That is to say, the inner wall of the enlarged diameter portion may include an inclined portion where the diameter of the inner wall increases in the direction toward the front end, or in other words, an inclined portion that is shown as "a straight line or a curved line inclined with respect to the axial direction so that the diameter of the inner wall increases in the direction toward the front end" in a cross section that is parallel to and is in contact with the axis. In addition to the inclined portion, the inner wall may also contain a straight portion as illustrated in FIG. 6, i.e., a straight portion where the inner wall has a constant diameter. The inner wall may include one or more straight portions and one or more inclined portions. The inner wall may include at least either a plurality of straight sections or a plurality of inclined portions. If the inner wall includes both a straight portion and an inclined portion, the straight portion may be located on the rear end side than the inclined portion is, or the straight portion may be located on the front end side than the inclined portion is. If the inner wall includes a plurality of inclined portions, the inclinations of the plurality of inclined portions with respect to the axial direction may be the same or may differ from each other.

In a sensor SQ shown in FIG. 7, an inner wall 215Q of an enlarged diameter portion 210Q of a housing 200Q includes an inclined portion 2022 where the diameter of the inner wall 215Q increases in the direction toward a front end portion 211Q, and a straight portion 2021 where the inner wall 215Q has a constant diameter. The inclined portion 2022 is located closer to a rear end portion 212Q of the enlarged diameter portion 210Q than the straight portion 2021 is. In other words, the straight portion 2021 is located closer to the front end portion 211Q of the enlarged diameter portion 210Q than the inclined portion 2022 is. In the example shown in FIG. 7, the inclined portion 2022 is in contact with the rear end portion 212Q of the enlarged diameter portion 210Q, and the straight portion 2021 is in contact with the front end portion 211Q of the enlarged diameter portion 210Q. In the inclined portion 2022, the diameter of the inner wall 215Q increases in the direction toward the front end portion 211Q. Therefore, in comparison regarding the amount of increase of the diameter of the inner wall 215Q in the axial direction, the amount of increase of the diameter of the inner wall 215Q is larger on the front end 211Q side than on the rear end 212Q side of the enlarged diameter portion 210Q.

In the example shown in FIG. 7, the inclined portion 2022 is expressed as "a straight line inclined with respect to the axial direction so that the diameter of the inner wall 215Q increases in the direction toward the front end portion 211Q" in a cross section that is parallel to and is in contact with the axis. However, the inclined portion 2022 may have a shape expressed as "a curved line inclined with respect to the axial direction so that the diameter of the inner wall 215Q increases in the direction toward the front end portion 211Q" in a cross section that is parallel to and is in contact with the axis. Each of the "inclined portions" in FIGS. 7 and 8 need only be a portion expressed as "a straight line or a curved line inclined with respect to the axial direction so that the diameter of the inner wall increases in the direction toward the front end portion" in a cross section that is parallel to and is in contact with the axis.

Also, in the example shown in FIG. 7, although the inclined portion 2022 is located closer to the rear end portion 212Q and the straight portion 2021 is located closer to the front end portion 211Q, the inclined portion 2022 may be located closer to the front end portion 211Q and the straight portion 2021 may be located closer to the rear end portion 212Q.

Furthermore, it is not essential that the inclined portion 2022 is in contact with the rear end portion 212Q of the enlarged diameter portion 210Q. The inclined portion 2022 need not be in contact with the rear end portion 212Q of the enlarged diameter portion 210Q, and the inclined portion 2022 may be in contact with the front end portion 211Q of the enlarged diameter portion 210Q. Similarly, it is not essential that the straight portion 2021 is in contact with the front end portion 211Q of the enlarged diameter portion 210Q. The straight portion 2021 need not be in contact with the front end portion 211Q of the enlarged diameter portion 210Q, and the straight portion 2021 may be in contact with the rear end portion 212Q of the enlarged diameter portion 210Q.

As illustrated in FIG. 7, in the enlarged diameter portion, the inner wall may include one or more straight portions (where the diameter of the inner wall is constant), in addition to the inclined portion. In the inner wall, the straight portions may be located on at least either the front end side or the rear end side of the inclined portion.

In a sensor SR shown in FIG. 8, in an enlarged diameter portion 210R of a housing 200R, an inner wall 215R includes a plurality of inclined portions where the diameter of the inner wall 215R increases in the direction toward a front end portion 211R, specifically, an inclined portion 2031 and an inclined portion 2033. The inclined portion 2031 is located closer to the front end portion 211R of the enlarged diameter portion 210R than the inclined portion 2033 is. In other words, the inclined portion 2033 is located closer to a rear end portion 212R of the enlarged diameter portion 210R than the inclined portion 2031 is. In the example shown in FIG. 8, the inclined portion 2031 is in contact with the front end portion 211R of the enlarged diameter portion 210R, and the inclined portion 2033 is in contact with the rear end portion 212R of the enlarged diameter portion 210R. In the inclined portion 2031, the diameter of the inner wall 215R increases in the direction toward the front end portion 211R. In the inclined portion 2033, the diameter of the inner wall 215R increases in the direction toward the front end portion 211R. Therefore, in comparison regarding the amount of increase of the diameter of the inner wall 215R in the axial direction, the amount of increase of the diameter of the inner wall 215R is larger on the front end portion 211R side than on the rear end portion 212R side of the enlarged diameter portion 210R.

Note that in the example shown in FIG. 8, the diameter of the inner wall 215R is constant in an intermediate portion 2032 connecting the inclined portion 2031 and the inclined portion 2033. That is to say, the intermediate portion 2032 that is formed as "a straight portion where the diameter of the inner wall is constant" is located between the inclined portion 2031 and the inclined portion 2033. However, it is not essential that the intermediate portion 2032 is formed as a straight portion, and the intermediate portion 2032 may be formed as an "inclined portion where the diameter of the inner wall increases in the direction toward the front end". That is to say, in the intermediate portion 2032, the diameter of the inner wall 215R may increase in the direction toward the front end portion 211R.

Also, in the example shown in FIG. 8, the inclination of the inclined portion 2031 with respect to the axial direction and the inclination of the inclined portion 2033 with respect to the axial direction are different. However, the inclination of the inclined portion 2031 with respect to the axial direction and the inclination of the inclined portion 2033 with respect to the axial direction may be the same. Further, when the inclinations are different, it is arbitrary which inclination is made larger.

Furthermore, if the inclination of the inclined portion 2031 with respect to the axial direction and the inclination of the inclined portion 2033 with respect to the axial direction are different, it is possible to directly connect the inclined portion 2031 and the inclined portion 2033 without providing the intermediate portion 2032.

As described above, the shape of the enlarged diameter portion where the diameter of the inner wall increases in the direction toward the front end portion need not be expressed as "one straight line or one curved line inclined with respect to the axial direction so that the diameter of the inner wall increases in the direction toward the front end portion" in a cross section that is parallel to the axis line and is in contact with the axis. In the enlarged diameter portion, the inner wall may include a plurality of straight portions, and the diameter of the inner wall in straight portions located closer to the front end need only be wider (larger) than the diameter of the inner wall in straight portion located closer to the rear end (FIG. 6). Also, in the enlarged diameter portion, the inner wall may include one or more inclined portions that are each expressed as "a straight line or a curved line inclined with respect to the axial direction so that the diameter of the inner wall increases in the direction toward the front end portion" in a cross section that is parallel to the axis and is in contact with the axis. When the inner wall includes one inclined portion in the enlarged diameter portion, a straight portion may be located on at least either the front end side or the rear end side of the inclined portion (FIG. 7). When the inner wall includes a plurality of inclined portions in the enlarged diameter portion, it is possible to provide a straight portion between a plurality of inclined portions (FIG. 8), and it is possible to directly connect the inclined portions to each other without providing a straight portion. When the inner wall includes a plurality of inclined portions in the enlarged diameter portion, the inclination (angle) of the plurality of inclined portions with respect to the axial direction may be different or the same. However, in the case of directly connecting two inclined portions without providing a straight portion, the inclinations (angles) of the two inclined portions with respect to the axial direction are different from each other.

(II) Configuration of Sensor Element

In the above embodiment, for each component of the sensor element 100, the component may be omitted, replaced, or added as appropriate. In another example, the sensor element may have a porous protective layer that covers at least a portion of the sensor element.

Figure 5:
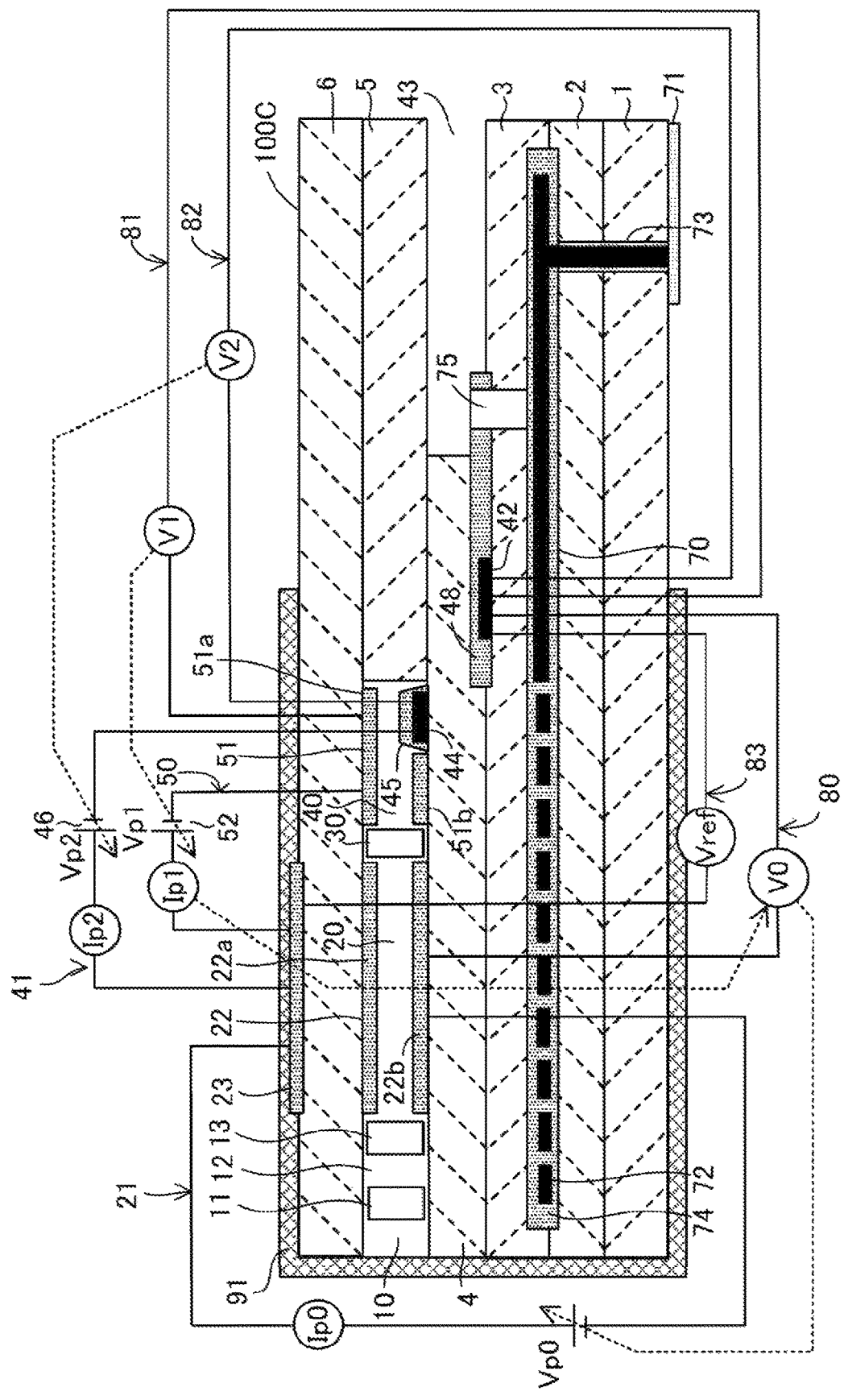
FIG. 5 is a schematic cross-sectional view schematically showing an example of a configuration of a sensor according to a modification.

FIG. 5 is a schematic cross-sectional view schematically showing an example of a configuration of a sensor element 100C according to the present modification. The sensor element 100C has the same configuration as the sensor element 100 except that the sensor element 100C additionally includes a porous protective layer 91. In the example in FIG. 5, the porous protective layer 91 covers a front end-side portion of the upper face (the upper face of the second solid electrolyte layer 6), a front end face (the face on the left side in FIG. 5), and a front end-side portion of the lower face (the lower face of the first substrate layer 1) of the sensor element 100C. Note that, if at least a portion of the sensor element 100C is covered by the porous protective layer 91, the range covered by the porous protective layer 91 is not limited to such an example, and may be appropriately determined according to the embodiment. The porous protective layer 91 may be made of, for example, a porous material such as an alumina porous material, a zirconia porous material, a spinel porous material, a cordierite porous material, a titania porous material, or a magnesia porous material. According to the present modification, due to the presence of the porous protective layer 91, it is possible to improve the strength of the sensor element 100C while lowering the effect of water when the sensor element 100C is exposed to water.

[Examples]

In order to verify the effects of the present invention, sensors according to the following examples and comparative examples were manufactured. However, the present invention is not limited to the examples below.

The inventors manufactured a sensor according to a first example by adopting the configuration shown in FIG. 1 above as the configuration of the sensor and the configuration shown in FIG. 2 above as the configuration of the sensor element. In the sensor according to the first example, as in the above embodiment, the sensor element was provided in the housing such that the rear end (the rearmost end) of the heat generation portion of the heater is located closer to the front end of the sensor than the rear end portion (the starting point) of the enlarged diameter portion is. The enlarged diameter portion of the housing was formed so as to have a 20 degree taper. The distance between the rear end portion of the enlarged diameter portion of the housing and the sensor element was 2 mm. The distance between the front end portion of the enlarged diameter portion of the housing and the sensor element was 3 mm.

The inventors manufactured a sensor according to a second example by changing the taper angle of the enlarged diameter portion of the first example to 30 degrees. The inventors manufactured a sensor according to a third example by changing the taper angle of the enlarged diameter portion of the first example to 40 degrees. The inventors manufactured a sensor according to a fourth example by changing the taper angle of the enlarged diameter portion of the first example to 60 degrees. The inventors manufactured a sensor according to a fifth example by changing the taper angle of the enlarged diameter portion of the first example to 10 degrees. The inventors manufactured a sensor according to a sixth example by changing the shape of the enlarged diameter portion of the first example to the rounded shape shown in FIG. 3. The radius of curvature of the inner wall of the enlarged diameter portion according to the sixth example was 2 mm. The inventors manufactured a sensor according to a first comparative example by omitting the enlarged diameter portion of the first embodiment and replacing the enlarged diameter portion with a portion that has a straight shape in which the diameter of the inner wall is constant. The inventors manufactured a sensor according a second comparative example by changing the location of the sensor element in the first example so that the rear end of the heat generation portion of the heater is located closer to the rear end of the sensor than the rear end portion (the starting point) of the enlarged diameter portion is. Other conditions for the second to sixth examples and the first and second comparative examples are the same as the conditions for the first example.

To evaluate the water exposure amount regarding the sensors according to the first to sixth examples and the first and second comparative examples, the water exposure testing device disclosed in JP 2019-185615A was used. This water exposure testing device includes a gas flow path inside, and includes a pipe that is positioned horizontally and linearly, a wind blower (blower) that is provided upstream of the pipe, a pressure fluctuation generator that is provided downstream of the pipe, and a chamber that is a portion of the pipe between the blower and the pressure fluctuation generator and to which a sensor according to one of the examples and the comparative examples is attached. A vibration exciter that applies vibration to the chamber is connected to the chamber. With this water exposure testing device, moisture can be dispersed toward the sensor, using a gas that imitates the exhaust gas from the engine.

In the water exposure test, first, the sensor was placed in the chamber of the water exposure testing device so that the central axis of the sensor is orthogonal to the axis of the pipe and is inclined by 10 degrees with respect to the horizontal direction. Next, a predetermined amount of water was supplied into a portion of the pipe between the blower and the chamber. Subsequently, gas (air) was supplied into the pipe using the blower, the pressure of the gas was fluctuated using the pressure fluctuation generator, and vibration was applied to the chamber, using the vibration exciter. Thus, the water supplied into the pipe was scattered toward the sensor provided in the chamber, using the gas with a fluctuated pressure. In this state, the heater built into the sensor element was driven, and the power of the heater was controlled so that the temperature of the sensor element reached a predetermined target value between 100 degrees Celsius and 200 degrees Celsius. The controlled value of the power of the heater at this time was applied to the relationship between the power of the heater and the water exposure amount derived in advance, and the water exposure amount regarding the sensor element in each of the examples and the comparative examples was calculated. The value of the water exposure amount no greater than 10 μL (microliter) was defined as "A (Excellent)", the value greater than 10 μL and no greater than 20 μL was defined as "B (Good)", and the value greater than 20 μL and no greater than 30 μL was defined as "C (acceptable)", and the value greater than 30 μL was defined as "F (not acceptable)", and the water exposure amount in each of the examples and the comparative examples was evaluated. Table 1 below shows the evaluation results of the examples and the comparative examples.

TABLE 1

| | Position of Rear End (Rearmost End) of Heat Generation Portion | Shape of Enlarged Diameter Portion of Housing | Evaluated Water Exposure Amount |
|---|---|---|---|
| First Example | Closer to Front End Than Starting Point of Enlarged Diameter Portion is | Tapered: 20° | B |
| Second Example | Closer to Front End Than Starting Point of Enlarged Diameter Portion is | Tapered: 30° | B |
| Third Example | Closer to Front End Than Starting Point of Enlarged Diameter Portion is | Tapered: 40° | A |
| Fourth Example | Closer to Front End Than Starting Point of Enlarged Diameter Portion is | Tapered: 60° | A |
| Fifth Example | Closer to Front End Than Starting Point of Enlarged Diameter Portion | Tapered: 10° | C |

TABLE 1-continued

| | Position of Rear End (Rearmost End) of Heat Generation Portion | Shape of Enlarged Diameter Portion of Housing | Evaluated Water Exposure Amount |
|---|---|---|---|
| Sixth Example | Closer to Front End Than Starting Point of Enlarged Diameter Portion is | Rounded Shape | B |
| First Comparative Example | — | N/A (Straight) | F |
| Second Comparative Example | Closer to Rear End Than Starting Point of Enlarged Diameter Portion is | Tapered: 20° | F |

As shown in Table 1, in the first and second comparative examples, the water exposure amount regarding the sensor element was greater than 30 μL, whereas, in all the examples, the water exposure amount regarding the sensor element was kept below 30 μL. The results show that the present invention can reduce the water exposure amount regarding the sensor element, especially the heat generation portion. Also, from the evaluation results regarding the first to fifth examples, it was found that when the enlarged diameter portion was formed so as to be tapered, the water exposure amount regarding the sensor element was effectively reduced by increasing the taper angle. In particular, it was found that setting the taper angle to be no less than 20 degrees, no less than 30 degrees, or no less than 40 degrees can effectively reduce the water exposure amount regarding the sensor element. Furthermore, from the evaluation results of the sixth example, it was found that the water exposure amount regarding the sensor element can be effectively reduced by forming the enlarged diameter portion so as to be a rounded shape.

LIST OF REFERENCE NUMERALS

S Sensor
100 Sensor Element
110 Front End Portion
120 Rear End Portion
70 Heater
72 Heat Generation Portion
721 Front End
722 Rear End
73 Lead Portion
200 Housing
210 Enlarged Diameter Portion
211 Front End Portion
212 Rear End Portion
215 Inner Wall

What is claimed is:

1. A sensor comprising:
a sensor element that includes a built-in heater and extends in a longitudinal direction; and
a housing that is formed so as to extend in the longitudinal direction and surround the sensor element,
wherein the sensor element includes a front end portion and a rear end portion,
the heater includes a heat generation portion and a lead portion,
the heat generation portion has a front end and a rear end, and is positioned on the same side as the front end portion side of the sensor element,
the housing includes an enlarged diameter portion that is formed so that a diameter of an inner wall of the housing increases in a direction toward the front end of the sensor, in a cross section that is parallel to an axis that extends in the longitudinal direction,
the enlarged diameter portion includes a front end portion and a rear end portion, and
the rear end of the heat generation portion is located closer to the front end of the sensor than the rear end portion of the enlarged diameter portion is.

2. The sensor according to claim 1,
where the enlarged diameter portion is formed so as to have a shape with a taper in the cross section.

3. The sensor according to claim 2,
wherein the angle of the taper is no less than 10 degrees and less than 90 degrees.

4. The sensor according to claim 2,
wherein the angle of the taper is no less than 20 degrees and less than 90 degrees.

5. The sensor according to claim 2,
wherein the angle of the taper is no less than 30 degrees and less than 90 degrees.

6. The sensor according to claim 1,
where the enlarged diameter portion is formed so as to have a rounded shape in the cross section.

7. The sensor according to claim 1, further comprising
a protective cover that extends in the longitudinal direction and surrounds at least a portion of the enlarged diameter portion of the housing, and is formed so as to extend beyond the front end portion of the sensor element.

8. The sensor according to claim 1,
wherein the sensor element has a porous protective layer that covers at least a portion of the sensor element.

9. The sensor according to claim 1,
wherein the sensor element is a gas sensor element.

* * * * *